United States Patent
Kachru et al.

(10) Patent No.: US 12,242,109 B2
(45) Date of Patent: Mar. 4, 2025

(54) DUAL LAYER OPTICAL COUPLING CONFIGURATION BETWEEN PHOTONIC INTEGRATED CIRCUIT AND EXTERNAL SINGLE MODE OPTICAL FIBER

(71) Applicant: Aayuna Inc., Allentown, PA (US)

(72) Inventors: Ravinder Kachru, San Jose, CA (US); Anujit Shastri, Saratoga, CA (US); Rao Yelamarty, Allentown, PA (US); Sriram Tyagarajan, Macungie, PA (US); David Snyder, Coopersburg, PA (US); Kalpendu Shastri, Orefield, PA (US)

(73) Assignee: Aayuna Inc., Allentown, PA (US)

( * ) Notice: Subject to any disclaimer, the term of this patent is extended or adjusted under 35 U.S.C. 154(b) by 126 days.

(21) Appl. No.: 18/271,878

(22) PCT Filed: Jan. 13, 2022

(86) PCT No.: PCT/US2022/012301
§ 371 (c)(1),
(2) Date: Jul. 12, 2023

(87) PCT Pub. No.: WO2022/155326
PCT Pub. Date: Jul. 21, 2022

(65) Prior Publication Data
US 2024/0069286 A1    Feb. 29, 2024

Related U.S. Application Data

(60) Provisional application No. 63/138,642, filed on Jan. 18, 2021.

(51) Int. Cl.
G02B 6/125    (2006.01)
G02B 6/293    (2006.01)
(Continued)

(52) U.S. Cl.
CPC ......... *G02B 6/125* (2013.01); *G02B 6/29331* (2013.01); *G02B 6/30* (2013.01); *G02B 2006/1215* (2013.01); *G02B 6/2821* (2013.01)

(58) Field of Classification Search
None
See application file for complete search history.

(56) References Cited

U.S. PATENT DOCUMENTS 7,120,335 B2    10/2006    Agarwal et al.
8,615,148 B2    12/2013    Chen et al.
(Continued)

OTHER PUBLICATIONS

Sun, Rong, et al., "Impedance matching vertical optical waveguide couplers for dense high index contrast circuits", Optics Express, Aug. 4, 2008, vol. 16, No. 16, pp. 11682-11690.
(Continued)

*Primary Examiner* — Jerry Rahll
(74) *Attorney, Agent, or Firm* — Wendy W. Koba

(57) ABSTRACT

A dual-layer coupling arrangement comprises a first coupling waveguide disposed within a photonic integrated circuit (at a position over an included optical signal waveguide) and a second coupling waveguide disposed above the first coupling waveguide. The first and second coupling waveguides are formed to exhibit splitter configurations that terminate as a pair arms separated by a distance suitable for creating beams that would coincide with a circular mode field of the core region of a coupling optical fiber. The vertical spacing between the first and second coupling waveguides is set so that the pairs of beams exiting from the terminating arms of the coupling waveguides coincide with a circular mode field.

16 Claims, 7 Drawing Sheets

(51) Int. Cl.
*G02B 6/30* (2006.01)
*G02B 6/12* (2006.01)
*G02B 6/28* (2006.01)

(56) References Cited

U.S. PATENT DOCUMENTS

| | | | |
|---|---|---|---|
| 9,766,408 | B2 | 9/2017 | Novack et al. |
| 10,156,678 | B2 | 12/2018 | Novack et al. |
| 10,191,217 | B2 * | 1/2019 | Boutami ............ G02B 6/29331 |
| 10,197,733 | B2 | 2/2019 | Pan et al. |
| 10,677,991 | B2 | 6/2020 | Novack et al. |
| 10,877,229 | B2 | 12/2020 | Tummidi |
| 11,747,559 | B2 * | 9/2023 | Bian ..................... G02B 6/1228 385/43 |
| 2003/0133662 | A1 * | 7/2003 | Kim ....................... G02B 6/125 385/28 |
| 2015/0104130 | A1 * | 4/2015 | Anderson ............ G02B 6/1228 385/28 |
| 2015/0247974 | A1 * | 9/2015 | Painchaud ............. G02B 6/124 385/28 |
| 2016/0077283 | A1 * | 3/2016 | Webster ............. G02B 6/12002 385/14 |
| 2016/0246005 | A1 * | 8/2016 | Liu ........................ G02B 6/126 |
| 2016/0356960 | A1 | 12/2016 | Novack et al. |
| 2018/0011249 | A1 | 1/2018 | Zhu et al. |
| 2018/0017732 | A1 | 1/2018 | Tassaert |
| 2018/0059329 | A1 * | 3/2018 | Boutami .............. G02B 6/1228 |
| 2019/0384003 | A1 | 12/2019 | Painchaud et al. |

OTHER PUBLICATIONS

Cao, Jun, et al., "Highly-efficient three-dimensional waveguide couplers using impedance-tunable transformation optics", Scientific Reports, Received Nov. 21, 2017, Accepted May 10, 2018, Published online Jun. 14, 2018, pp. 1-8.

Singh, G., et al., "Estimation of the Performance of a 3-dB Y-Junction Optical Coupler with a Channel Profile of Proton-Exchanged Lithium Niobate", Physics of Wave Phenomena, 2013, vol. 21, No. 3, pp. 201-206.

* cited by examiner

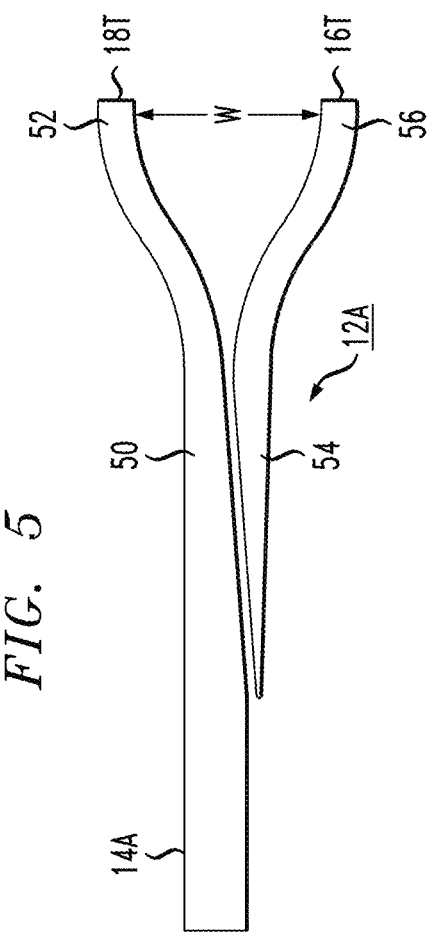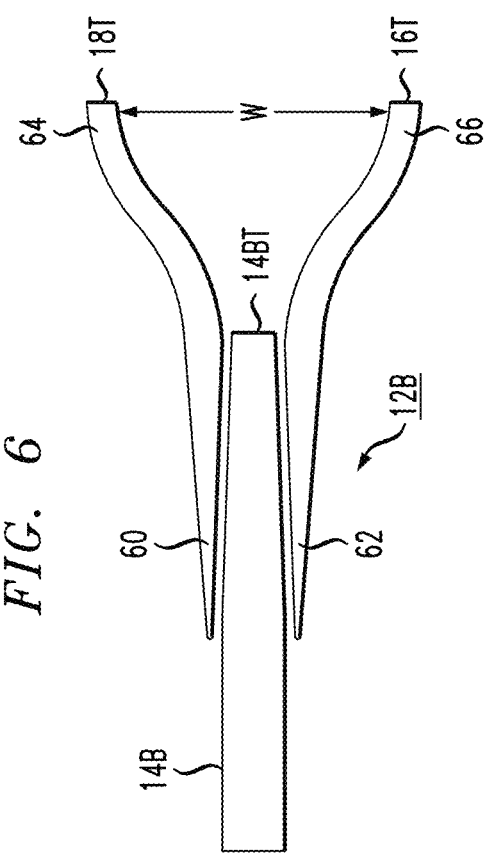

DUAL LAYER OPTICAL COUPLING CONFIGURATION BETWEEN PHOTONIC INTEGRATED CIRCUIT AND EXTERNAL SINGLE MODE OPTICAL FIBER

CROSS-REFERENCE TO RELATED APPLICATIONS

This application claims the benefit of U.S. Provisional Application No. 63/138,642, filed Jan. 18, 2021 and herein incorporated by reference.

TECHNICAL FIELD

The present invention relates to the implementation of photonic integrated circuits (PICs) and, more particularly, to configurations for coupling optical waveguides formed in PICs to associated single mode optical fibers.

BACKGROUND OF THE INVENTION

Advances continue to be made regarding the use of silicon-based integrated optical circuits (also referred to as "photonic integrated circuits", "photonic ICs", or simply "PICs") as a generic platform in a wide range of applications from data communications to sensing systems. The ability to use conventional CMOS-compatible wafer-scale fabrication techniques allows for high-density PICs to be formed for relatively low cost.

Inasmuch as silicon has a high refractive index, a single mode silicon waveguide as fabricated in a PIC exhibits a sub-micron mode size. When needing to couple an optical signal from such a silicon waveguide integrated within a PIC to an external signal path (typically, a single mode optical fiber), the waveguide typically terminates along a sidewall (edge) surface of the PIC, with an intermediate free-space coupler used to improve the coupling efficiency between the sub-micron mode size of the waveguide and a several-micron (e.g., 10 µm) mode field diameter (MFD) of a conventional single mode fiber.

A technique to further improve the coupling between the sub-micron mode size of the PIC-based silicon waveguides and the several-micron MFD external signal paths (such as optical fibers) is to form an inverse taper along a terminal portion of the silicon waveguide. In particular, an inverse taper involves a reduction in waveguide width near the interface with the single mode fiber. Reduction in waveguide width expands the mode into the surrounding silica ($SiO_2$) and hence propagation of an expanded beam. Another implementation uses an ultra large numerical aperture (ULNA) fiber. This improves the coupling efficiency but requires a splice to the transmission single mode fiber and the concomitant loss at the splice location.

A current approach to improving coupling efficiency is based upon the use of a plurality of silicon nitride waveguides disposed within separate layers of the PIC structure to create a type of "vertical coupling" based upon evanescent field coupling between the various layers. The several waveguides all terminate at the same edge of the PIC and are spaced vertically and horizontally within the PIC structure so that the collective group of beams exiting the PIC mimic the form of a circular composite mode in the far field, preferred for improved coupling into a fiber core region. While a workable solution, the need to include several additional layers within the PIC to form this structure adds to the overall size of the PIC, as well as requiring a significant number of additional fabrication steps, increasing the complexity and cost of the system.

SUMMARY OF THE INVENTION

The needs remaining in the prior art are addressed by the present invention, which relates to a dual-layer vertical stack arrangement that provides efficient edge coupling between a PIC-based silicon waveguide and an associated external optical signal path (such as an optical fiber, typically a single mode optical fiber).

In particular, a dual-layer vertical coupling arrangement has been developed that creates essentially the same composite circular mode as the prior art, but requires fewer layers (and as a result, less processing) than the prior art configuration discussed above. The dual-layer coupling arrangement is formed in the PIC and is disposed above an optical waveguide (which may be formed of silicon or a similar material) that is supporting the propagation of an optical communication signal.

In accordance with the principles of the present invention, a dual-layer coupling arrangement comprises a first coupling waveguide disposed within the PIC at a position over the signal-propagating waveguide, and a second coupling waveguide disposed above the first one. Both coupling waveguides are formed of a material such as silicon nitride or silicon oxynitride (or similar composition) that will create evanescent coupling with the signal waveguide and transfer the energy of the propagating signal from this original waveguide into the pair of coupling waveguides. The first coupling waveguide is formed as a Y-splitter configuration (or other splitter arrangements terminating in a pair of spaced-apart waveguiding sections), where the two arms of the Y are separated by a distance suitable for creating beams that would coincide with a circular mode field of the core region of a coupling fiber. The second coupling waveguide may also be formed as a Y-splitter, or any other arrangement that terminates in a pair of waveguide sections that are positioned directly above the arms of the first coupling waveguide. The vertical spacing between the first and second coupling waveguides is set so that the pair of beams exiting from the second coupling waveguide will also coincide with the circular mode field. An optical signal propagating along the silicon waveguide will be evanescently coupled into the first coupling waveguide, and thereafter also coupled into the second coupling waveguide. By virtue of splitting the optical signal into a set of four beams exiting the dual-layer structure, the desired circular mode field is created for efficient coupling into the core region of the optical fiber.

An exemplary embodiment takes the form of a dual-layer coupling arrangement for providing optical signal coupling between an optical signal-supporting waveguide formed within a photonic integrated circuit (PIC) and an external optical signal path. The dual-layer coupling arrangement includes a pair of coupling waveguides that are vertically spaced apart (by an amount S), with the first, lower coupling waveguide positioned above the optical signal waveguide. In particular, the first coupling waveguide of the pair is formed within a first layer of the PIC at a location above the signal-supporting waveguide (and comprises a material with a refractive index value that creates evanescent coupling of a propagating optical signal between the signal waveguide and the first coupling waveguide), where the first coupling waveguide is formed as a Y-splitter waveguide (or similar arrangement terminating in a pair of spaced-apart waveguide arms) terminating near a side edge of the PIC as a pair of waveguide arms separated by a width W. The second coupling waveguide of the pair also comprises a material with a refractive index value that creates evanescent coupling of a propagating optical signal between the first coupling waveguide and the second coupling waveguide. The second coupling waveguide includes a pair of separate waveguide sections disposed above the pair of waveguide arms of the first coupling waveguide, the pair of separate waveguide sections separated by the same width W and terminating along the side edge of the PIC. The values of W and S are selected such that a set of beams associated with the edge terminations from the first and second coupling waveguides will coincide with a circular mode profile of an external optical transmission path disposed along the side edge of the PIC for coupling to the included signal waveguide.

Other embodiments of the present invention may easily be configured to include an arrangement of coupling arrangements formed in the pair of waveguiding layers forming the dual-layer structure, thus providing efficient coupling between an array of optical signal-supporting waveguides and an array of optical fibers (or any other type of output signal path).

Other and further aspects and embodiments of the present invention will become apparent during the course of the following discussion and by reference to the accompanying drawings.

BRIEF DESCRIPTION OF THE DRAWINGS

Referring now to the drawings, where like numerals represent like parts in several views:

FIG. 5 is a top view of an alternative splitter geometry (as compared to the Y-splitter of FIG. 3), still terminating as a pair of spaced-apart waveguiding arm sections;

FIG. 6 is a top view of yet another splitter geometry that also terminates as a pair of spaced-apart waveguiding arm sections;

DETAILED DESCRIPTION

This invention achieves high coupling efficiency with an external single mode fiber (or similar single mode external signal path) with only two layers of silicon nitride (and/or silicon oxynitride) waveguides instead of the multiple layers of the prior art. The reduction in nitride layer processing by at least 50% reduces cost, manufacturing tolerances and increases yield and reliability. The principles of the present invention can be best explained by reference to FIG. 1, which illustrates the dual layer concept, here utilizing a separate Y-splitter waveguide in each layer. For the purposes of discussion, the waveguide coupling layers (or splitters) may often be referred to as "silicon nitride coupling layers", "silicon nitride splitters", or similar terms. As will become apparent during the course of the following discussion, the use of a pair of Y-splitters per se is only one exemplary waveguide topology that may be used. In general, any type of "splitter" that terminates as a pair of waveguide sections (i.e., "arms") that are separated by a controlled amount, with each arm supporting a beam of like optical power. It is to be understood that various other materials having similar properties, particularly with respect to refractive index value and compatibility with standard CMOS processing may be used to form the inventive dual-layer coupling arrangement, where silicon oxynitride is one other appropriate choice.

Figure 1:
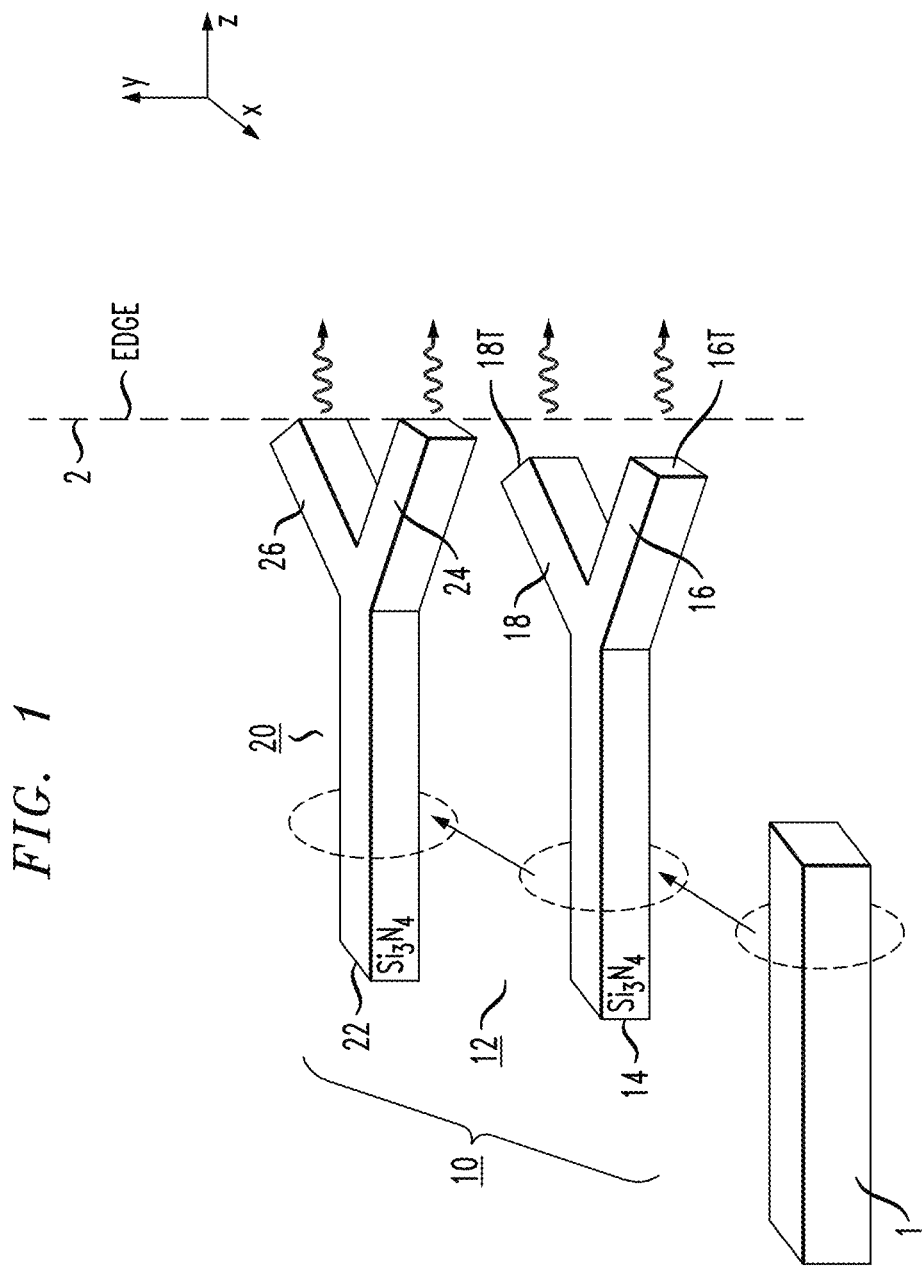
FIG. 1 is a simplified isometric view of an exemplary dual-layer coupling arrangement formed in accordance with the principles of the present invention.

The simplified isometric view of FIG. 1 illustrates an exemplary optical signal-supporting waveguide 1 (included within a PIC structure, not shown) that supports the propagation of an optical signal. In many cases, this original signal waveguide comprises a silicon waveguide, but other materials may be used and the composition of the originating optical signal waveguide is not considered as an aspect of the present invention.

Dual-layer coupling arrangement 10 of the present invention is shown in the exemplary configuration of FIG. 1 as comprising a first silicon nitride Y-splitter waveguide 12 formed in a separate layer so as to be positioned above (in the y-axis direction) waveguide 1. In particular, a base section 14 of first Y-splitter 12 is positioned to overly an end termination of waveguide 1, with evanescent coupling used to transfer the lightwave energy from waveguide 1 to first Y-splitter 12. As shown, base section 14 thereafter splits to form a pair of waveguide arms 16, 18 that are spaced apart along the x-direction of the structure, with half of the propagating beam energy then exiting along each separate end termination 16T, 18T of waveguide arms 16 and 18, respectively. Terminations 16T, 18T are positioned along an edge of the PIC, depicted as a vertical line 2 in FIG. 1 for illustrative purposes.

The particular configuration of dual-layer coupling arrangement 10 as shown in FIG. 1 further comprises a second silicon nitride (or silicon oxynitride) Y-splitter 20 that is formed in a separate layer so as to be positioned above first Y-splitter 12. A base section 22 of second Y-splitter 20 is positioned above base section 14 of first Y-splitter 12, with evanescent coupling taking place between first Y-splitter 12 and second Y-splitter 20. As with first Y-splitter 12, base section 22 of second Y-splitter 20 thereafter splits into a pair of separate waveguide arms 24, 26 that also terminate along edge 2 of the PIC (shown as terminations 24T and 26T in FIG. 1). The collective set of beams exiting at 16T, 18T, 24T and 26T are positioned to as to coincide with a circular-shaped mode of the core region of an associated transmission fiber (as discussed in detail below in association with the illustrations of FIGS. 2-4), forming a highly efficient coupling into a single mode optical fiber.

Embodiments of the present invention thus achieve vertical coupling between waveguides with extremely low loss, with all of the energy transferred from waveguide 1 to first Y-splitter 12. Specifically, the vertical separation between the original signal-supporting waveguide 1 and first Y-splitter 12 of coupling arrangement 10 may be within the 0.001 µm to 5 µm range.

Figure 2:
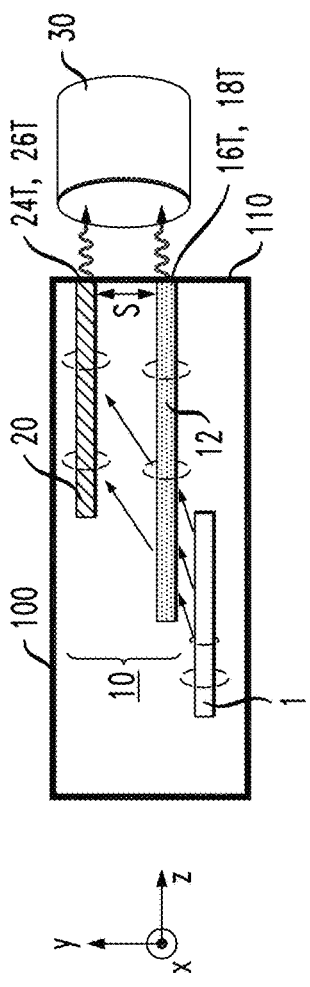
FIG. 2 is a side view of a portion of a photonic integrated circuit (PIC), illustrating the relative position of the dual-layer coupling arrangement with respect to an included silicon waveguide, as well as the relative positions of the individual waveguiding layers forming the dual-layer arrangement.
Figure 3:
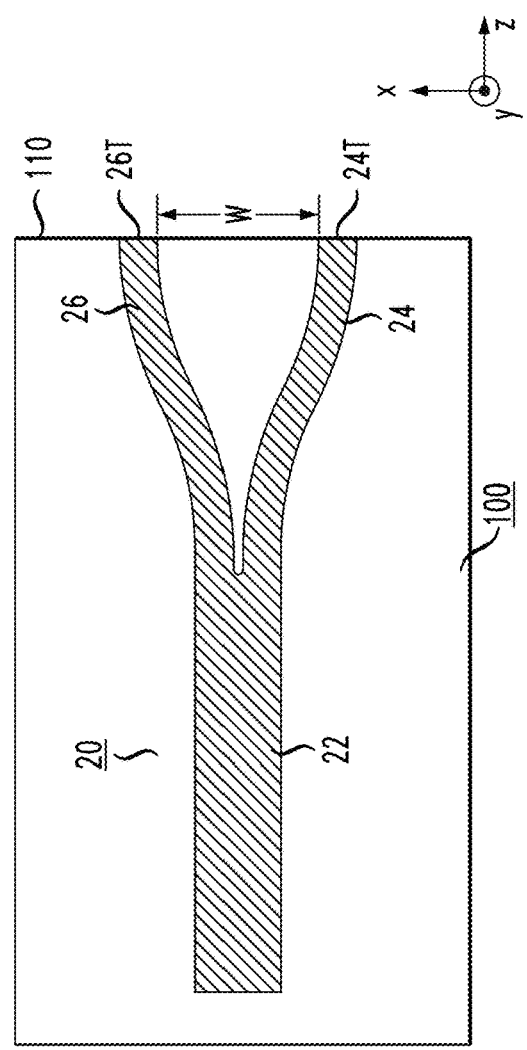
FIG. 3 is a top view of the arrangement of FIG. 2, particularly illustrating the Y-splitting geometry of the coupling waveguide.

FIG. 2 is a simplified side view of a typical PIC showing original signal waveguide 1 and dual-layer coupling arrangement of the present invention as discussed above in association with FIG. 1. Waveguide 1 and dual-layer coupling arrangement 10 are shown as formed within an exemplary PIC 100, disposed on separate layers of the PIC structure. Waveguide 1 is shown as terminating within the body of PIC 100, ensuring that all of the energy within the propagating optical beam is evanescently coupled into dual-layer coupling arrangement 10. This coupling is diagrammatically shown in FIG. 2, with the beam initially coupling into first Y-splitter 12 and thereafter into second Y-splitter 20. As discussed above, the beams propagating along each Y-splitter are thereafter directed into the pair of arms forming the terminal portion of the associated Y-splitter. FIG. 3 is a top view of PIC 100, taken along line 3-3 of FIG. 2, showing the Y-splitter arrangement of second Y-splitter 20, with arms 24, 26 as formed in the terminal portion of the splitter. The separation W between the arms is selected so that the emitted beams will coincide with a circular mode field boundary of the coupling fiber core region.

Referring back to FIG. 2 (as well as FIG. 3), a sidewall edge 110 of PIC 100 is shown, with the end face terminations T of arm waveguides 16, 18, 24, and 26 all disposed along edge 110. A core region 30 of a coupling single mode optical fiber is shown in FIG. 2 as positioned adjacent to edge 110 so as to be aligned with dual-layer coupling arrangement 10. In accordance with the principles of the present invention, the vertical spacing S between first Y-splitter 12 and second Y-splitter 20 is selected to correspond with the mode field diameter (MFD) of the coupling fiber. Thus, both the vertical spacing S between splitters 12, 20 and the horizontal separation W between the arm terminations of a given Y-splitter are selected to ensure that all four beams will be coupled into core region 30.

Figure 4:
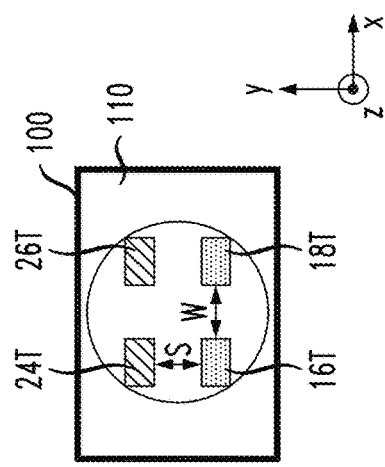
FIG. 4 is an edge view of the PIC, showing the spacing of the individual waveguide terminations, as coinciding a circular mode field.

FIG. 4 is an edge view of PIC 100, showing the positions of the terminations T of Y-splitters 12, 20 and also illustrating spacing S and separation W, as discussed above. An exemplary contour of the boundary of core region 30 is also shown in this view. Both TE and TM modes of waveguide arms 16, 18, 24, and 26 will be coupled to the corresponding mode in core region 30 of a coupling single mode optical fiber. In this manner, therefore, the far-field mode of dual-layer coupling arrangement 10 can be made the same as coupling fiber with the appropriate vertical and horizontal separation. When a single mode waveguide (SMF-28 for instance) is placed in close proximity to edge 110 of PIC 100 where coupling arrangement 10 is located, the propagating optical energy will be very efficiently coupled from the Y-splitter waveguides 12, 20 into core region 30 and vice versa. In addition, a wide band coupler can be achieved.

FIG. 5 is a top view of an alternative geometry for the first coupling waveguide forming the inventive dual-layer coupling arrangement. In particular, a first coupling waveguide splitter 12A comprises a base section 14A similar to that described above, providing evanescent coupling of a propagating optical signal from a waveguide (not shown) disposed beneath splitter 12A into the inventive dual-layer coupling arrangement. In this case, instead of utilizing a conventional Y-splitter, base section 14A continues along a curved path 50 to form a first waveguide arm 52. A separate waveguide section 54 is shown as disposed adjacent to base section 14A and out-couples a portion of the propagating beam, creating a curved geometry that terminates to form a second waveguide arm 56. As with the embodiment described above, the separation W between waveguide arms 52, 56 is controlled to coincide with a circular mode field of a coupling fiber (or any other type of external coupling configuration). The inverse taper geometry of waveguide section 54 (discussed in detail below in association with FIG. 7) is used to ensure that half of the original optical power is transferred from base section 14A to second waveguide arm 56.

FIG. 6 illustrates yet another waveguide configuration that may be used to form a termination as a pair of spaced-apart waveguide sections (arms), where each arm supports an optical beam of essentially the same power. In this arrangement, a first coupling waveguide splitter 12B comprises a base section 14B in combination with a pair of separate waveguiding sections 60, 62 disposed on opposing sides of base section 14B, as shown. In this arrangement, base section 14B tapers toward its end termination 14BT. Waveguiding sections 60, 62 both comprise an inverse taper geometry that results in directing half of the propagating beam energy from base section 14B into each section 60, 62 (as long as the sections comprise the same geometry). First waveguiding section 60 is shown as curving in a controlled manner to form a first waveguiding arm 64, with second waveguiding section 62 curving to form a second waveguiding arm 66 that exhibits symmetric configuration with first waveguiding arm 64.

The two alternatives as shown in FIGS. 5 and 6 are considered to be exemplary only. Various other waveguiding arrangements may be created that evenly distribute the power of a propagating optical signal into a pair of spaced-apart terminating arm sections, with the dual-layer arrangement providing a set of four terminating arm sections that are separated vertical by a defined amount S, with each pair of arms separated by a defined amount W.

In particular embodiments, the set of four waveguide arms may terminate at a location that is slightly recessed with respect to endface 110 of PIC 100. For example, terminations 16T, 18T, 24T, and 26T may be disposed within an area that is recessed by an amount in the range of 0.1-1.0 µm from the edge of PIC 100. For these embodiments, the end terminations of the splitter arms (as well as the sidewalls and top surface of the arms) are surrounded by $SiO_2$.

Figure 7:
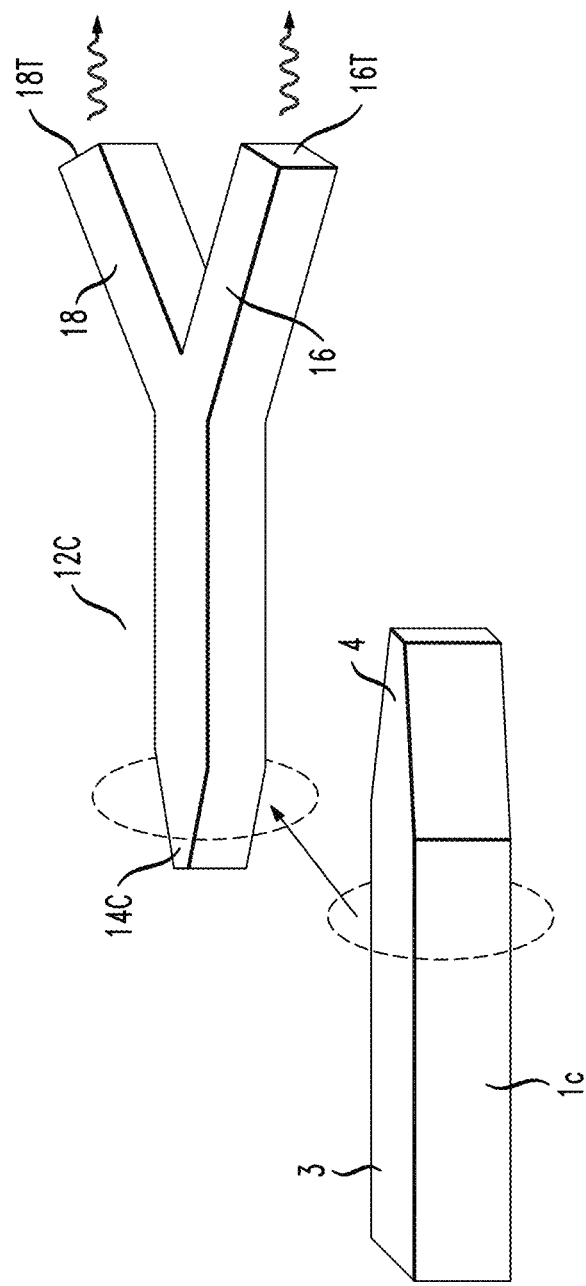
FIG. 7 illustrates an exemplary inverse taper waveguide geometry that may be used in the dual-layer coupling arrangement of the present invention.

As mentioned above, preferred embodiments of the present invention may utilize an inverse taper waveguide geometry to facilitate the coupling between waveguide 1 and Y-splitters 12, 20. FIG. 7 illustrates an exemplary inverse taper configuration of an original signal-supporting waveguide 1C and a first Y-splitter silicon nitride coupling waveguide 12C of dual-layer coupling arrangement 10C. The inverse taper topology functions to expand a spatial extent of an optical mode of a propagating beam as it travels from the wider (input) portion 3 of waveguide 1C into the more narrow (tapered) output portion 4. A similar effect is created by forming input section 14C of Y-splitter 12C to have a similar taper structure. While not specifically illustrated in FIG. 7, second Y-splitter 20 may be formed to exhibit the same inverse taper configuration as Y-splitter 12C. The coupling is considered to be adiabatic, meaning that the propagating optical beams essentially maintain the same mode when transferred from first Y-splitter 12 to second Y-splitter (that is, little or no coupling between the propagating mode and other non-intended modes will take place). Of course, similar inverse tapers may be used in the configurations as shown in FIGS. 5 and 6, as well as any other suitable waveguide geometry for the dual-layer coupling arrangement of the present invention.

While the illustration of FIG. 7 shows the use of a linear taper region, it is contemplated that the waveguides of the present invention may instead be exponentially tapered (or even tapered by some higher-order polynomial), as long as the adiabatic property of the waveguide coupling is maintained.

Figure 8:
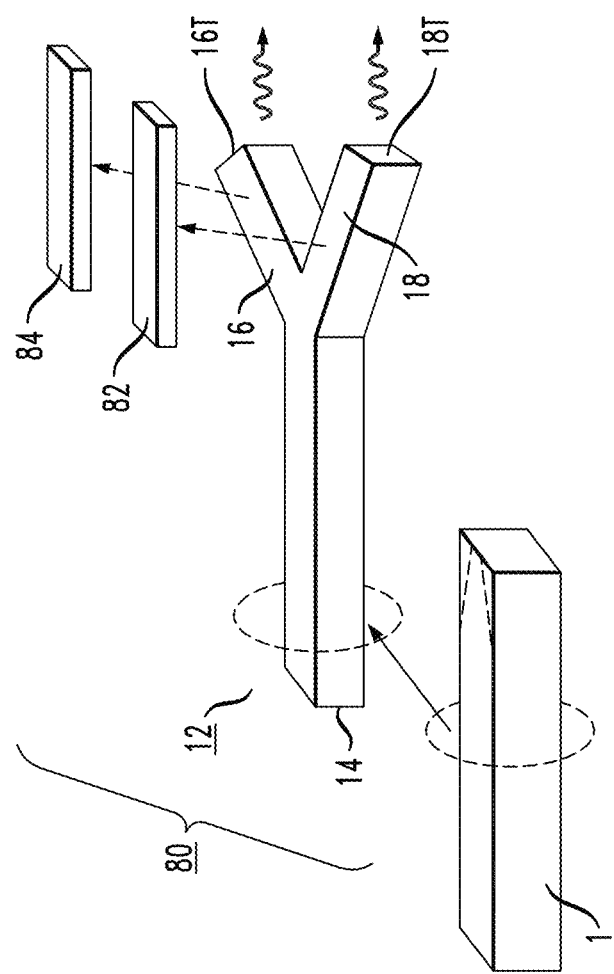
FIG. 8 illustrates an alternative configuration of the embodiment of FIG. 1, in this case using a pair of separate waveguide sections to form the coupling arrangement in the second layer of the dual-layer coupling arrangement.

FIG. 8 is a simplified isometric view of an alternative embodiment of a dual-layer coupling arrangement as formed in accordance with the present invention. In this embodiment, second Y-splitter 20 of arrangement 10 (see FIG. 1, for example) is replaced by a pair of conventional waveguide 82 and 84, forming an upper waveguide layer 80. As shown, each waveguide section is disposed over a separate arm of first Y-splitter 12, with waveguide section 82 positioned above first waveguide arm 16 and waveguide section 84 positioned above second waveguide arm 18. The various waveguide sections may be formed in an inverse taper configuration as discussed above for optimum coupling efficiency. The cross-sectional view of this embodiment along edge 110 of PIC 100 will be essentially the same as that shown in FIG. 4.

While the above discussion is directed to providing coupling between an individual silicon waveguide and an individual coupling fiber, it is to be understood that the principles of the present invention are also applicable to arrangements where a multiple number of silicon waveguides are to be coupled into separate optical fibers. In most cases, such a configuration is referred to as using an "array" of coupling fibers to mate with an array of silicon waveguides.

Figure 9:
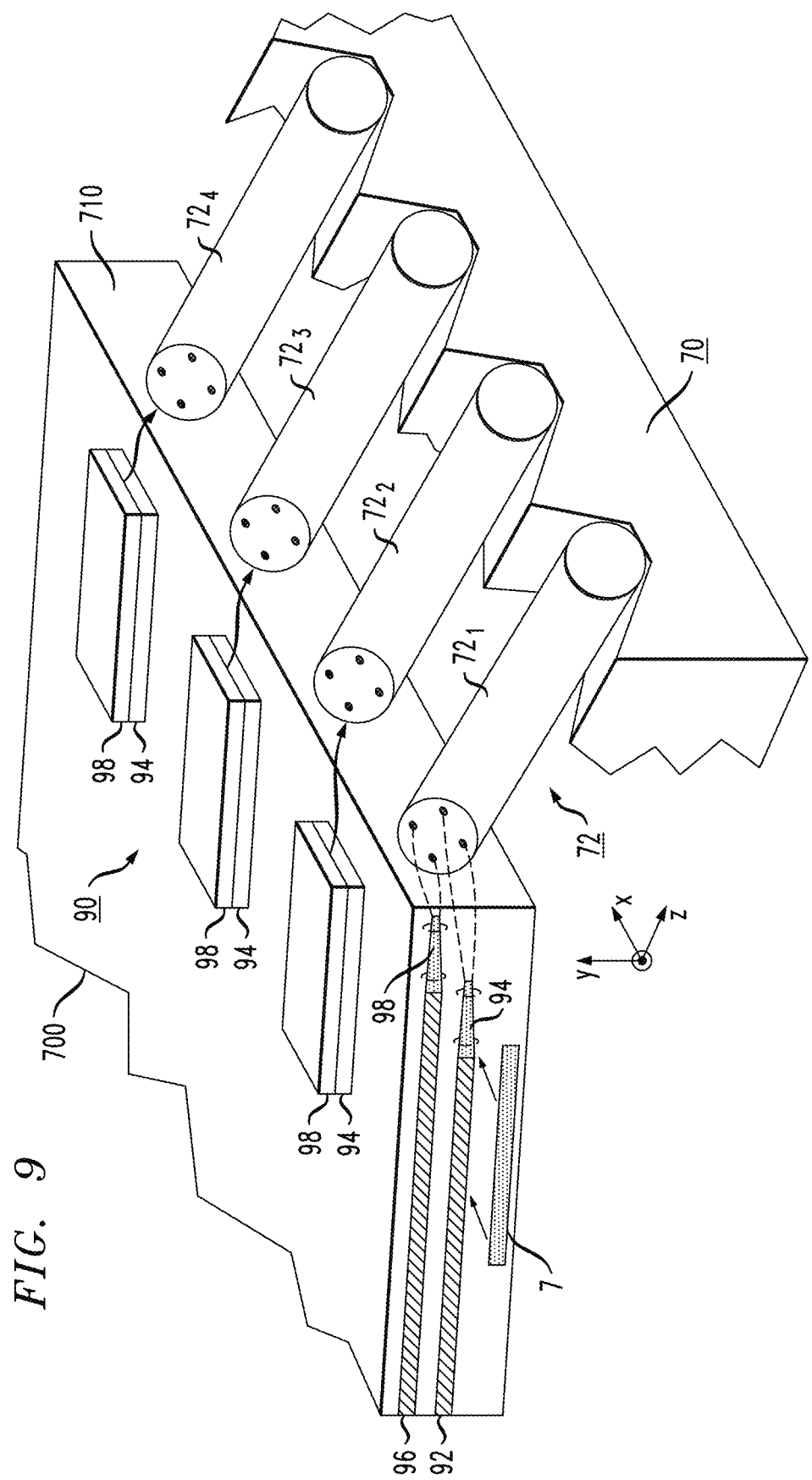
FIG. 9 is a simplified isometric side view of another embodiment of the present invention, in this case illustrating a dual-layer coupling arrangement that may be used to provide coupling between an array of silicon waveguides and an array of external signal paths (such as an array of optical fibers)
Figure 10:
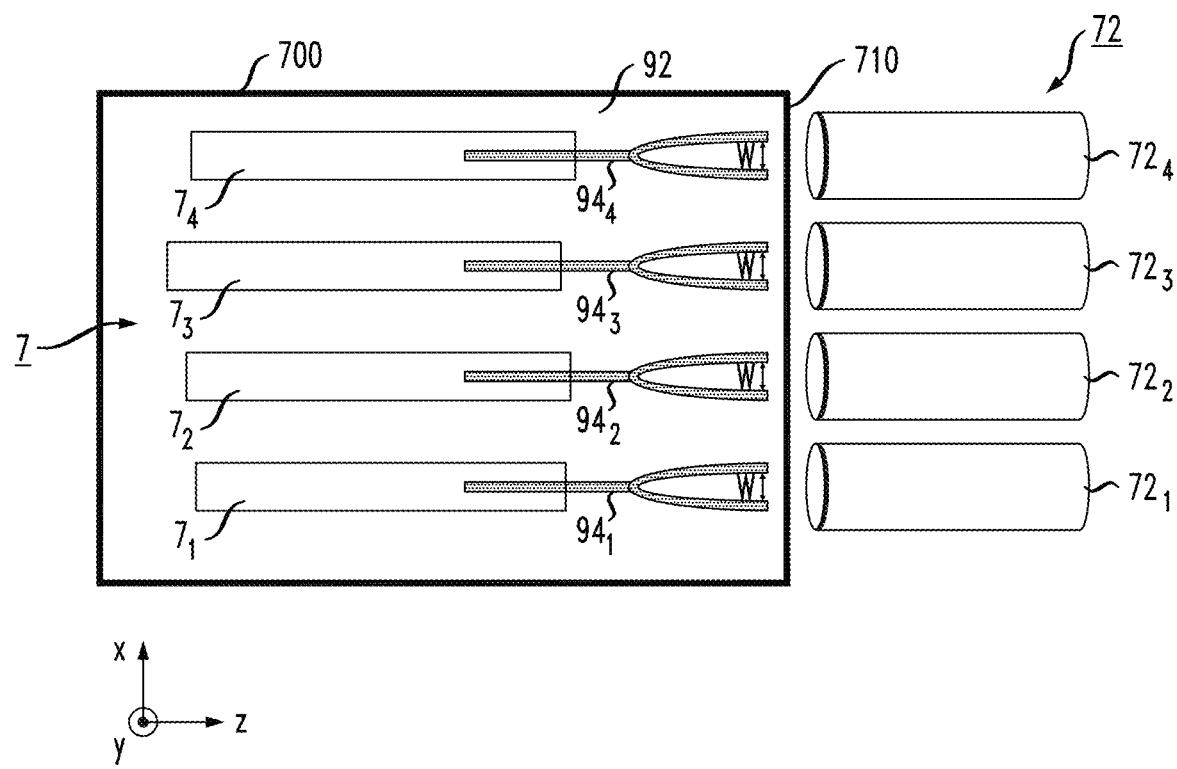
FIG. 10 is a top view of the first coupling layer of the arrangement of FIG. 9, showing a plurality of Y-splitting waveguides, disposed along the layer in a array configuration, each Y-splitting waveguide associated with a separate one of the silicon waveguides (as shown in phantom)
Figure 11:
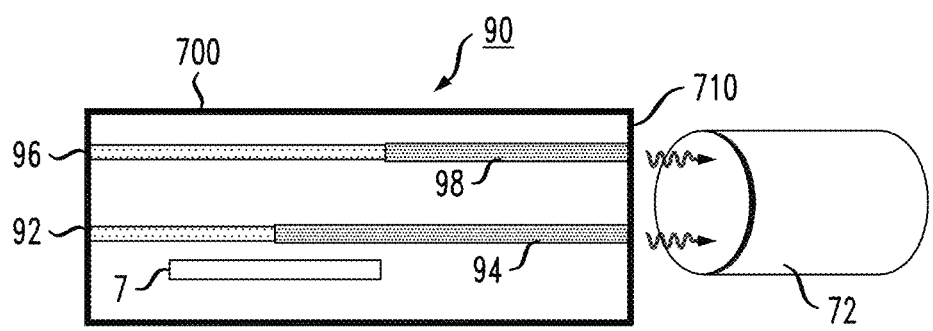
FIG. 11 is a side view of the arrangement of FIGS. 9 and 10, clearly illustrating the positioning of the individual waveguiding layers forming the dual-layer coupling arrangement.

FIGS. 9-11 illustrate, in different perspective views, an exemplary dual-layer coupling arrangement 90 formed in accordance with the principles of the present invention to provide coupling between an array of waveguides and an associated optical fiber array.

In particular, FIG. 9 is an isometric side view illustrating a plurality of signal-supporting waveguides 7 disposed in a typical 1×N array (here, N=4) and formed within a PIC 700. An associated optical fiber array 70 is represented in this arrangement as a set of four individual core regions $72_1$, $72_2$, $72_3$, and $72_4$ of the coupling single mode fibers. Dual-layer coupling arrangement 90 is formed within PIC 700 and used to couple the plurality of waveguides 7 to fiber array 70. Dual-layer coupling arrangement 90 comprises a first silicon nitride waveguide coupling layer 92 including a set of four Y-splitters $94_1$, $94_2$, $94_3$, and $94_4$ disposed in the x-direction along PIC 700 in a manner that facilitates alignment to associated fiber core regions $72_1$, $72_2$, $72_3$, and $72_4$, as shown.

Continuing, dual-layer coupling arrangement further comprises a second silicon nitride waveguide coupling layer 96 disposed above first coupling layer 92 and separated therefrom by the defined separation S associated with ensuring that all beams coincide with a circular mode form associated with the core region of the coupling fiber. In this embodiment, second waveguide coupling layer 96 is formed to include a set of four Y-splitters $98_1$, $98_2$, $98_3$, and $98_4$ to complete the dual-layer coupling arrangement of the present invention.

FIG. 10 is a top view of an exemplary first silicon nitride coupling layer 92, showing Y-splitters $94_1$, $94_2$, $94_3$, and $94_4$, with individual silicon waveguides $7_1$, $7_2$, $7_3$, and $7_4$ shown in phantom as positioned underneath their associated coupling Y-splitter 94 (FIG. 9 illustrates the relationship for silicon waveguide $7_1$ and Y-splitter $94_1$). FIG. 11 is a side view of PIC 700, clearly illustrating the positioning of first silicon nitride waveguiding layer 92 and second silicon nitride waveguiding layer 96 over silicon waveguides 7.

It is to be understood that dual-layer array coupling arrangement 90 of FIGS. 9-11 may utilize an inverse taper waveguide geometry, as discussed above in association with FIG. 8, to increase the optical coupling efficiency of arrangement when compared to using non-tapered waveguides. Additionally, a pair of parallel silicon nitride waveguides may be used instead of a given Y-splitter 88 in the formation of second coupling layer 86 (see, for example, the arrangement of FIG. 6). Moreover, configurations of dual-layer coupling arrangement 90 may use waveguides formed of any suitable splitting geometry, including (but not limited to) the alternative configurations shown in FIGS. 5 and 6.

Summarizing, the present invention provides a highly efficient mode coupler between sub-micron dimensioned silicon waveguides and butt-coupled single mode optical fibers. Indeed, coupling is provided by using waveguide splitters formed within only two separate layers of a PIC structure, as opposed to the need for three or more such silicon nitride (or silicon oxynitride) waveguiding layers in the prior art. The savings in the number and processing of these waveguiding layers results in a lower cost arrangement than the prior art (with comparable coupling efficiency) as well as an improved manufacturing tolerance in terms of maintaining alignment between the various waveguides in the "stack up" vertical direction within the PIC structure.

While the principles of the present invention have been particularly shown and described with respect to illustrative and preferred embodiments, it will be understood by those skilled in the art that the foregoing and other changes in form and details may be made therein without departing from the spirit and scope of the invention, which should be limited only by the scope of the claims appended hereto.

What is claimed is:

1. A dual-layer coupling arrangement for providing optical signal coupling between a signal-supporting optical waveguide formed within a photonic integrated circuit (PIC) and an external optical signal path, the arrangement comprising a first coupling waveguide formed within a first layer of the PIC at a location above the signal-supporting optical waveguide and comprising a material with a refractive index value that promotes evanescent coupling between the signal-supporting optical waveguide and the first coupling waveguide, the first coupling waveguiding formed as a splitter waveguide arrangement terminating near a side edge of the PIC as a first pair of waveguide arms separated by a width W, the splitter waveguide arrangement configured to direct half of the propagating beam energy into each waveguide arm; and a second coupling waveguide formed within a second layer of the PIC at a location above the first coupling waveguide, the second coupling waveguide vertically spaced above the first coupling waveguide by a separation S and comprising a material with a refractive index value that promotes evanescent coupling of a propagating optical signal between the first coupling waveguide and the second coupling waveguide, the second coupling waveguide formed as a splitter waveguide arrangement terminating near the side edge of the PIC as a second pair of waveguide arms separated by a width W, the splitter waveguide arrangement configured to direct half of the propagating beam energy into each waveguide arm of the second pair of waveguide arms, wherein the values of W and S are selected such that a set of beams associated with the edge terminations from the first and second coupling waveguides coincide with a circular mode profile of an external optical transmission path positioned along the side edge of the PIC for coupling to the included signal-supporting optical waveguide.

2. The dual-layer coupling arrangement as defined in claim 1 wherein at least one of the first coupling waveguide and the second coupling waveguide comprises a Y-splitter waveguide geometry.

3. The dual-layer coupling arrangement as defined in claim 1 wherein at least one of the first coupling waveguide and the second coupling waveguide comprises a base waveguide section and an adjacent tapered waveguide section, the adjacent tapered waveguide section configured to out-couple half of the propagating optical beam energy, the base waveguide section and the adjacent tapered waveguide section terminate as the pair of waveguide arms.

4. The dual-layer coupling arrangement as defined in claim 1 wherein at least one of the first coupling waveguide and the second coupling waveguide comprises a base waveguide section and a pair of tapered waveguide sections disposed laterally on either side of the base waveguide section, the base waveguide section and the adjacent tapered waveguide sections configured to equally transfer the propagating optical beam energy from the base waveguide section into the pair of adjacent tapered waveguide sections, forming the pair of waveguide arms.

5. The dual-layer coupling arrangement as defined in claim 1 wherein the second coupling waveguide comprises a pair of separate waveguides, defining the pair of waveguide sections.

6. The dual-layer coupling arrangement as defined in claim 1 wherein the first coupling waveguide and the second coupling waveguide are formed of silicon nitride.

7. The dual-layer coupling arrangement as defined in claim 1 wherein the first coupling waveguide and the second coupling waveguide are formed of silicon oxynitride.

8. The dual-layer coupling arrangement as defined in claim 1 wherein the first coupling waveguide is formed of silicon nitride.

9. The dual-layer coupling arrangement as defined in claim 1 wherein the first coupling waveguide is formed of silicon oxynitride.

10. The dual-layer coupling arrangement as defined in claim 1 wherein the first coupling waveguide comprises an inverse taper geometry for facilitating a complete transfer of optical energy from the signal-supporting optical waveguide to the dual-layer coupling arrangement.

11. The dual-layer coupling arrangement as defined in claim 10 wherein the second coupling waveguide comprises an inverse taper geometry for facilitating equal distribution of optical energy between the first coupling waveguide and the second coupling waveguide.

12. The dual-layer coupling arrangement as defined in claim 1 wherein the end terminations of the first and second coupling waveguides are coincident with the side edge of the PIC.

13. The dual-layer coupling arrangement as defined in claim 1 wherein the end terminations of the first and second coupling waveguides are recessed by an amount no greater than 5 μm from the side edge of the PIC.

14. The dual-layer coupling arrangement as defined in claim 1 wherein the values of S and W are selected such that the edge terminations of the first and second coupling waveguides coincide with a circular mode profile of a core region of a single mode optical fiber.

15. A dual-layer coupling arrangement for providing optical coupling between an array of N signal-supporting optical waveguides formed within a PIC and an array of N external optical signal paths, the dual-layer coupling arrangement comprising
 a first coupling layer formed within the PIC at a location above the array of N signal-supporting optical waveguides and comprising a material with a refractive index value that promotes evanescent coupling of a propagating optical signal between a signal-supporting optical waveguide of the plurality of N signal-supporting optical waveguides and the first coupling layer, the first coupling layer formed to include a first plurality of N splitter waveguide arrangements, each splitter waveguide arrangement terminating near a side edge of the PIC as a first pair of waveguide arms separated by a width W, the splitter waveguide arrangement configured to direct half of the propagating beam energy into each waveguide arm; and
 a second coupling layer formed in the PIC at a location above the first coupling layer, the second coupling layer vertically spaced above the first coupling layer by a separation S and comprising a material with a refractive index value that creates evanescent coupling of a propagating optical signal between the first coupling layer and the second coupling layer, the second coupling waveguide formed to include a second plurality of N splitter waveguide arrangements positioned above the first plurality of N splitter waveguide arrangements in a one-to-one relationship, each splitter waveguide arrangement terminating near a side edge of the PIC as a first pair of waveguide arms separated by a width W, the splitter waveguide arrangement configured to direct half of the propagating beam energy into each waveguide arm, wherein the values of W and S are selected such that N sets of beams associated with the edge terminations from the first and second coupling layers will coincide with a set of N circular mode profiles of the array of N external optical transmission paths disposed along the side edge of the PIC for coupling to the included array of N signal-supporting waveguides.

16. The dual-layer arrangement as defined in claim 15 wherein the edge terminations from the first and second coupling layers coincide with circular mode profiles of core regions within an array of single mode fibers, the arrangement of single mode fibers positioned along the side edge of the PIC for coupling to the included array of N signal-supporting waveguides.

* * * * *